March 17, 1970 W. J. ELLIOTT 3,501,588

TELEVISION CAMERA TUBE SYSTEM UTILIZING A PLURALITY OF IMAGE PICKUP DEVICES TO PRODUCE A SUPERIOR QUALITY IMAGE

Filed Nov. 6, 1967 4 Sheets-Sheet 1

INVENTOR:
VILLARD J. ELLIOT
By [illegible] ATTYS

INVENTOR
WILLARD J. ELLIOT
By [signature]
ATTYS

TELEVISION CAMERA TUBE SYSTEM UTILIZING A PLURALITY OF IMAGE PICKUP DEVICES TO PRODUCE A SUPERIOR QUALITY IMAGE
Filed Nov. 6, 1967 4 Sheets-Sheet 3

INVENTOR
WILLARD J. ELLIOT
By [signature]

March 17, 1970 W. J. ELLIOTT 3,501,588

TELEVISION CAMERA TUBE SYSTEM UTILIZING A PLURALITY OF IMAGE PICKUP DEVICES TO PRODUCE A SUPERIOR QUALITY IMAGE

Filed Nov. 6, 1967 4 Sheets-Sheet 4

INVENTOR
WILLARD J. ELLIOT
By [signature]
ATTYS

United States Patent Office 3,501,588
Patented Mar. 17, 1970

3,501,588

TELEVISION CAMERA TUBE SYSTEM UTILIZING A PLURALITY OF IMAGE PICKUP DEVICES TO PRODUCE A SUPERIOR QUALITY IMAGE

Willard John Elliott, Ste. 705, 1205 Grant Ave., Winnipeg 9, Manitoba, Canada

Continuation-in-part of application Ser. No. 403,313, Oct. 12, 1964. This application Nov. 6, 1967, Ser. No. 680,750
Int. Cl. H04n 5/26, 9/08
U.S. Cl. 178—7.2 4 Claims

ABSTRACT OF THE DISCLOSURE

This invention relates to television cameras and produces a picture with a Vidicon tube having most of the advantages of a picture produced with a more expensive image orthicon tube. This result is obtained by using two Vidicon tubes, one with a translucent element just before its image plate. A beam splitter is so arranged as to form similar images on the two tubes. One image is of low resolution and the other of normal resolution. The signals produced from the two Vidicon tubes are combined in a mixing circuit so that the resulting signal when reproduced as a television picture will have the broad area contrast reduced and therefore the fine detail contrast will be relatively greater.

My invention relates to new and useful improvements in television cameras and is a continuation-in-part of my United States application, Ser. No. 403,313, filed Oct. 12, 1964, now abandoned.

It is well known in the television broadcasting art that a television camera utilizing a pickup tube of the type known as an image orthicon produces a television picture of superior quality to that produced by any other known means.

As far as resolution, a camera utilizing a pickup tube, commonly known as a Vidicon, can produce a picture of just as great if not greater resolution than an image orthicon camera. However, to the eye of the observer, the picture produced by the image orthicon camera looks much better.

This difference in picture quality is due to three factors. One is that the target of the Vidicon exhibits a leakage effect which causes a soft appearance in the resulting picture. The second is the ability of the image orthicon tube to reproduce fine detail, that is accentuated in relation to the broad detail. The third is the ability of the image orthicon tube to compress a logarithmic increase in light values into a linear increase in signal output.

This invention is a means adapted to produce a picture of similar quality to that produced by the image orthicon, by the use of a camera that uses two pickup tubes of the Vidicon or similar type.

The image orthicon, because of its high cost of manufacture and relatively short life, is an expensive tube to operate. The Vidicon tube however, because of its lower cost of manufacture and longer life has an hourly operating cost that is a small fraction of that of the image orthicon tube.

Therefore this invention provides a more economical means of obtaining pictures of this quality.

An object of my invention is to provide a means whereby the leakage effects of the photo conductive target of Vidicon type tubes and other like television pickup tubes, may be provided with compensation. The leakage effect is the leakage across the target of current from a picture element to the area immediately surrounding the picture element, the effect being lessened as the distance from the picture element is increased.

Another object of the invention is to cause an enhancement of the fine detail in the picture so as to produce a crispness in the picture similar to the crispness that is a characteristic of the image orthicon type television pickup tube.

A further object of the invention is to provide a device of the character herewithin described in which means are provided to compress a logarithmic increase in light values into a linear increase in signal output without reduction in fine detail, so that a greater range of light tonal values may be handled by the system. This is similar to the effect achieved when the image orthicon type tube is operated "on the knee" so that a logarithmic grey scale is reproduced linearly in the waveform of the output of the camera.

Still another object of the invention is to provide a means of aperture correction that corrects not only horizontally (as past practical aperture correction systems have done) but also corrects vertically. Aperture correction compensates for a reduction in the amplitude response of fine detail in the picture due to the finite size of the scanning beam and also due to the lens system abberations.

The objects of my invention are partially achieved by providing a means whereby a technique similar to the "area masking" technique of photography may be applied to television cameras.

Area masking is a technique used in photography to reduce the tonal range of high contrast prints without reducing the fine detail. A low contrast positive transparency which is out of focus is made from the negative. This positive is then superimposed on the negative and the final print made.

It is known that this technique has been applied to television before. United States Patent No. 2,911,468 describes an invention by Louis L. Pourciau which uses a flying spot scanner in conjunction with two photo-electric devices for the reproduction of film.

This system is however, large in size and is limited to the reproduction of transparent film or slides only.

The present invention is of advantage over the above in the fact that it is not only compact in size but also is able to reproduce live scenes and opaques as well as transparent films.

Throughout this description wherever the word "scene" is used it is also intended to apply to the pickup of opaques and transparent films as well as live scenes.

Also, although the device is for use primarily with Vidicon type tubes, it will be appreciated that it can be used with advantage, with any form of pickup device. For example, a recent pickup device which is similar to a Vidicon is a Plumbicon tube. For this reason I use the term "image pickup devices" in the claims.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 10:
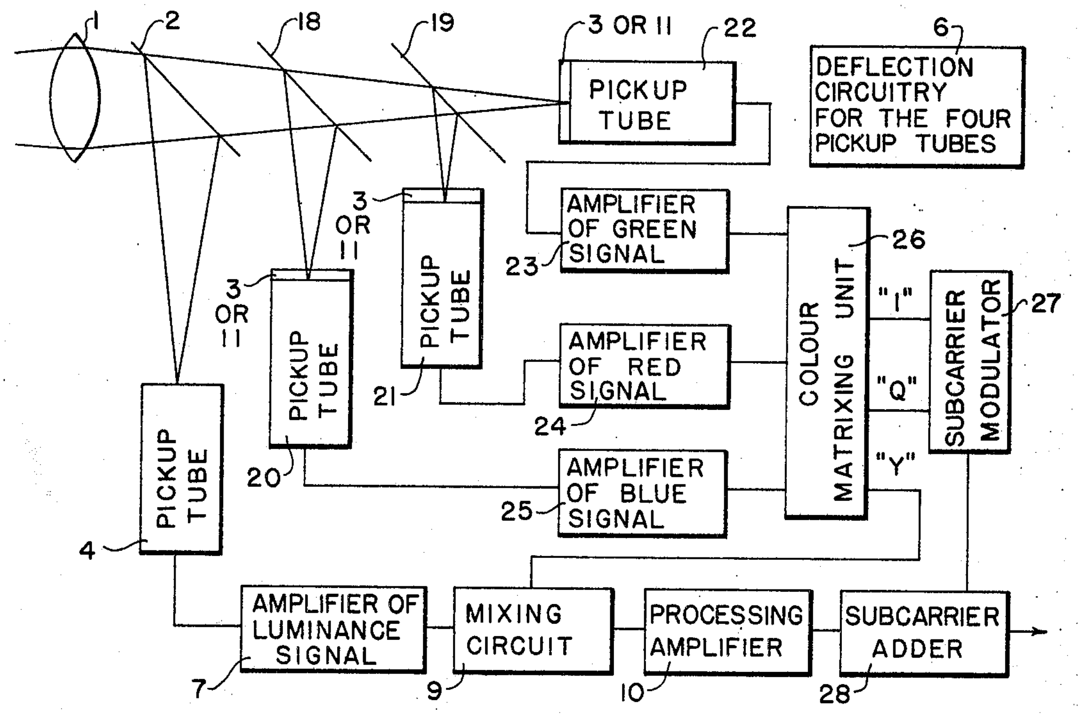
FIGURE 10 is a schematic block diagram showing an embodiment for a color camera using four pickup tubes.
Figure 1:
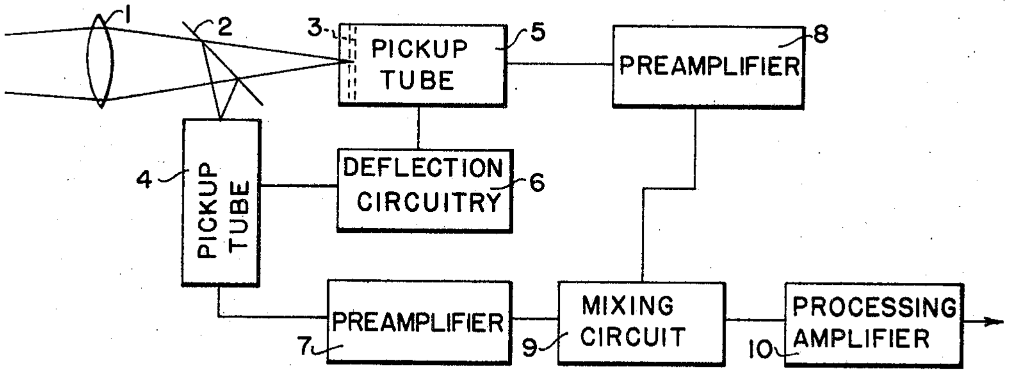
FIGURE 1 is a simplified block diagram and optical system of the camera.

Referring first to FIGURE 1, it will be seen that the circuit includes a pair of pickup tubes 4 and 5 situated substantially at right angles to one another and having the electron beams deflected by deflection circuitry 6 which provides horizontal and vertical sweep for both tubes 4 and 5.

Image bearing light rays from the object are caused to form two similar images on the image plates of pickup tubes 4 and 5 by lens system 1 and beam splitter 2. The lens system consisting of several lenses and the beam splitter taking the form of a semi-transparent mirror.

However, the image on the image plate of pickup tube 5 is caused to be of very low resolution due to the light diffusion caused by a translucent element 3.

I have found that this translucent element may consist of finely ground glass or any other suitable translucent material. This translucent element is detachably secured to the image plate in spaced and parallel relationship.

The signals from tubes 4 and 5 pass through preamplification circuits 7 and 8 and are combined in a mixing circuit 9 in such proportion and polarity that the signal from pickup tube 5 reduces the amplitude of the signal from the pickup tube 4 in the broad area regions of the scene but the fine details remains of the same amplitude as no fine detail is present in the low resolution signal from pickup tube 5. The signal now passes through the processing amplifier 10 which provides the output video of the camera.

Figure 2:
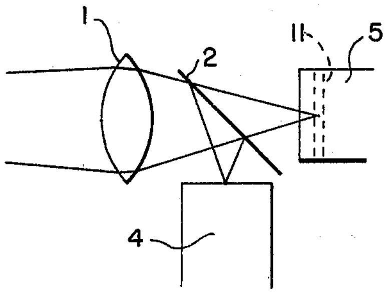
FIGURE 2 is a view showing a different embodiment of the optical system.

FIGURE 2 shows a further embodiment of the optical system of the invention where the element 11 placed in the light path near the image surface of pickup tube 5 is partially translucent and partially transparent. In this embodiment the electron beam of pickup tube 5 is enlarged so that the amplitude response just reaches zero at 300 lines or some other number of lines considered the upper limit desired for 100% output. The translucent-transparent element is constructed of a piece of ground glass which has been partially repolished.

Figure 3:
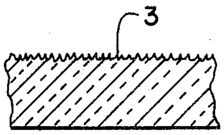
FIGURE 3 is an enlarged view of a portion of the cross section of the ground glass.

FIGURE 3 shows an enlarged cross section representing ground glass showing the continuous surface roughness.

Figure 4:
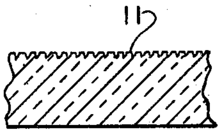
FIGURE 4 is an enlarged view of a portion of the cross section of the partially polished ground glass.

FIGURE 4 shows an enlarged cross section representing partially polished ground glass showing how the surface is composed partially of smooth areas and partially of rough areas resulting in a translucent-transparent element. The use of this embodiment permits the simultaneous compensation for both target leakage and aperture correction.

By mixing the proper proportions of the two signals in mixer 9, an amplitude response that is almost flat to 300 lines or other desired upper limit, may be obtained.

Figure 5:
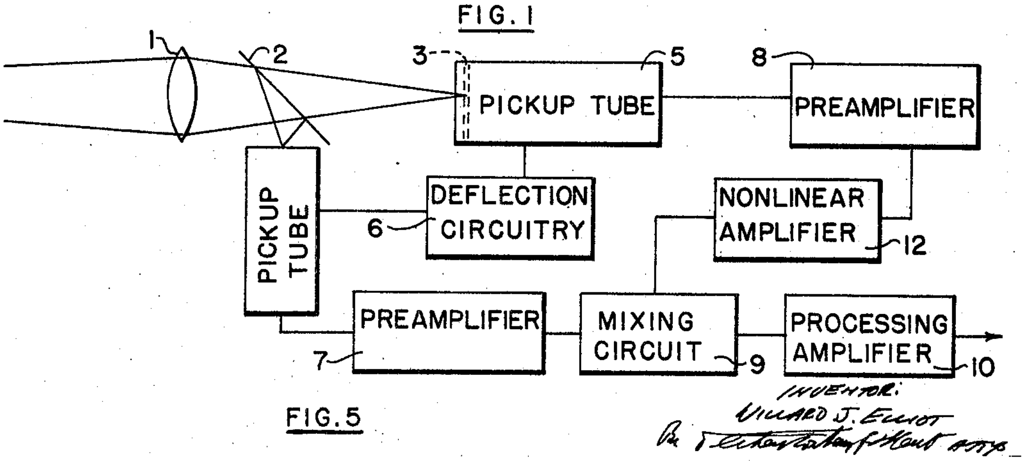
FIGURE 5 is another embodiment of the invention in block diagram form including the optical system of the camera.

FIGURE 5 is the same as FIGURE 1 except that it shows a non-linear amplifier 12 added between the preamp 8 and mixer 9. This amplifier permits the greater amplification of the portion of the signal representing the highlights of the scene than the portions of the signal representing the dark areas of the scene. The result is that when this signal is mixed with the signal from pickup tube 4 it reduces the amplitude of the highlight broad areas by a greater amount than the darker broad areas with the result that a logarithmic increase in light results in a linear increase in signal, thus permitting a greater range of light tonal values to be handled by the television system.

Figure 6:
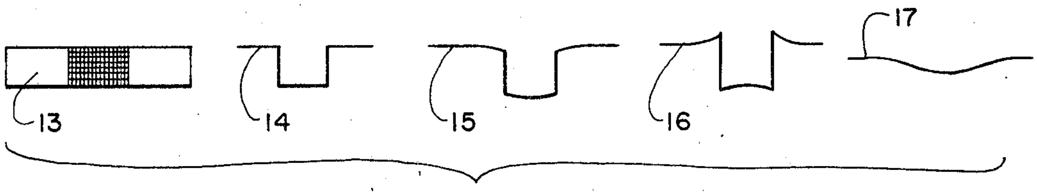
FIGURE 6 is a group of waveforms and the object from which they are reproduced, illustrating the operation of the camera.
Figure 7:
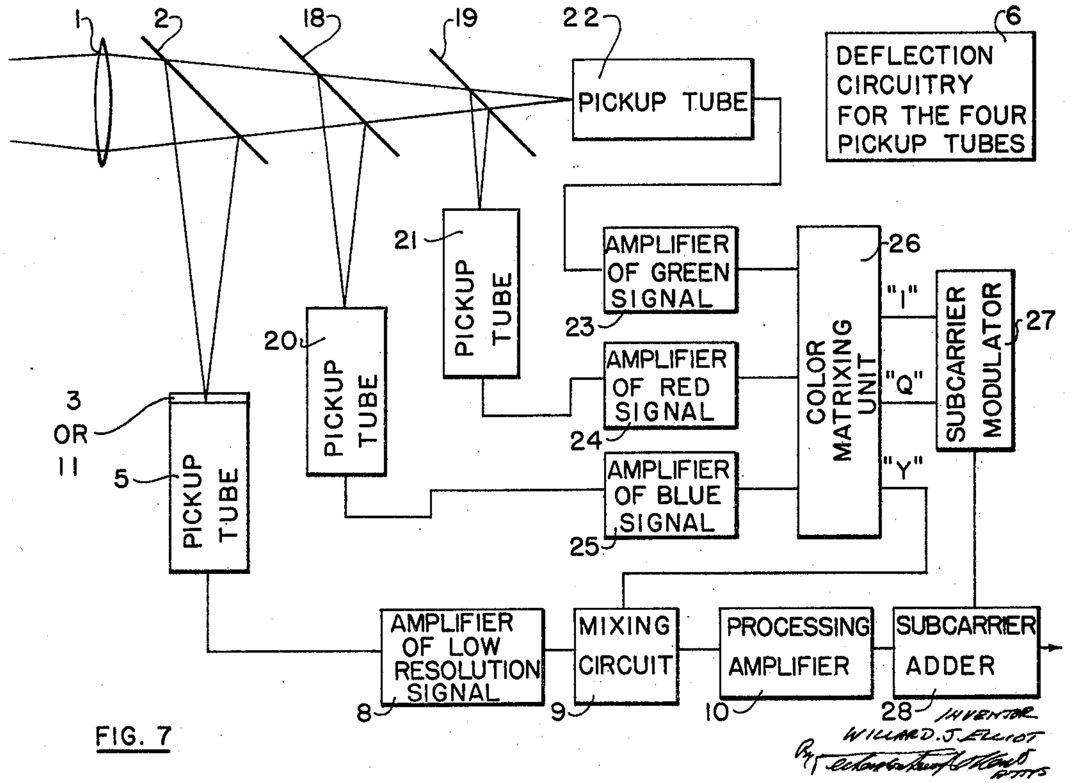
FIGURE 7 is a schematic block diagram showing an embodiment for a color camera utilizing four pickup tubes.
Figure 8:
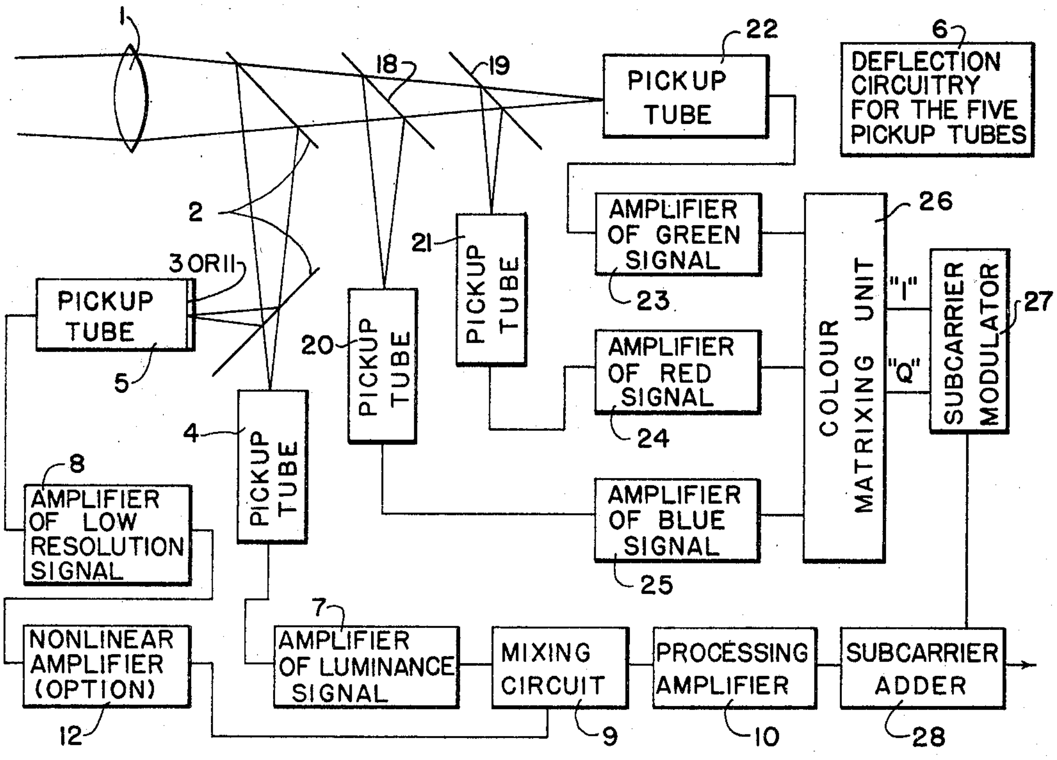
FIGURE 8 is a schematic block diagram showing an embodiment for a color camera using five pickup tubes.
Figure 9:
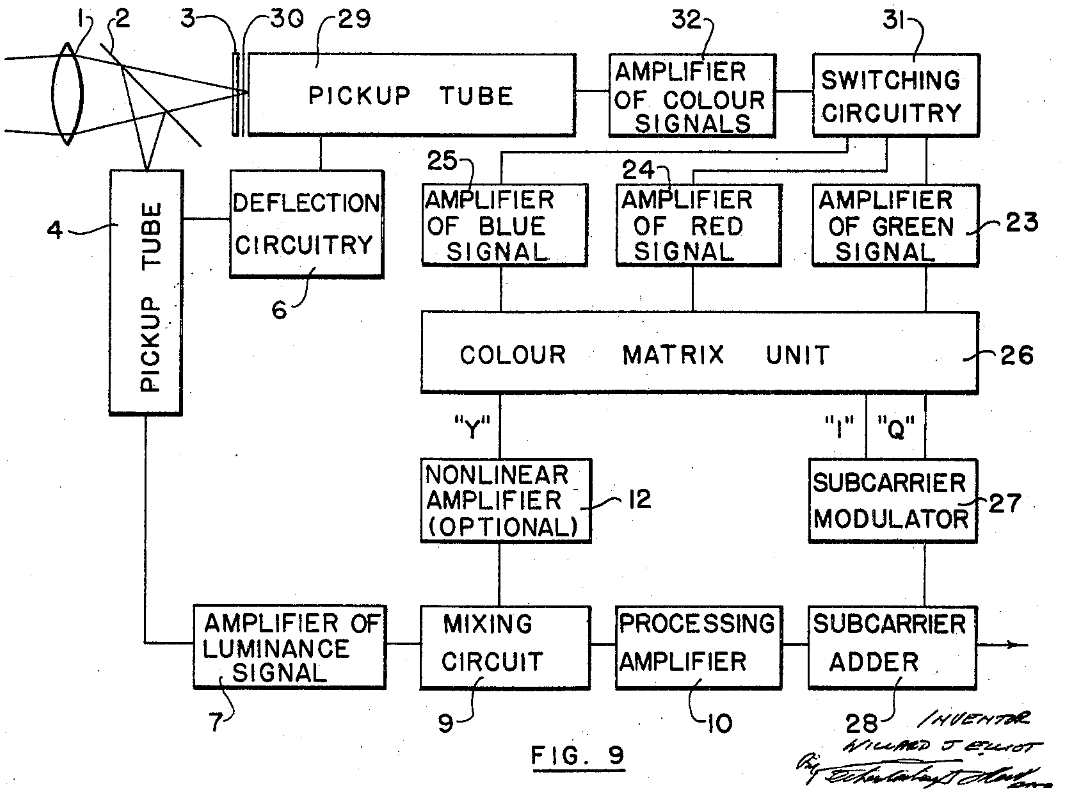
FIGURE 9 is a schematic block diagram showing an embodiment for a color camera using two pickup tubes.
Figure 11:
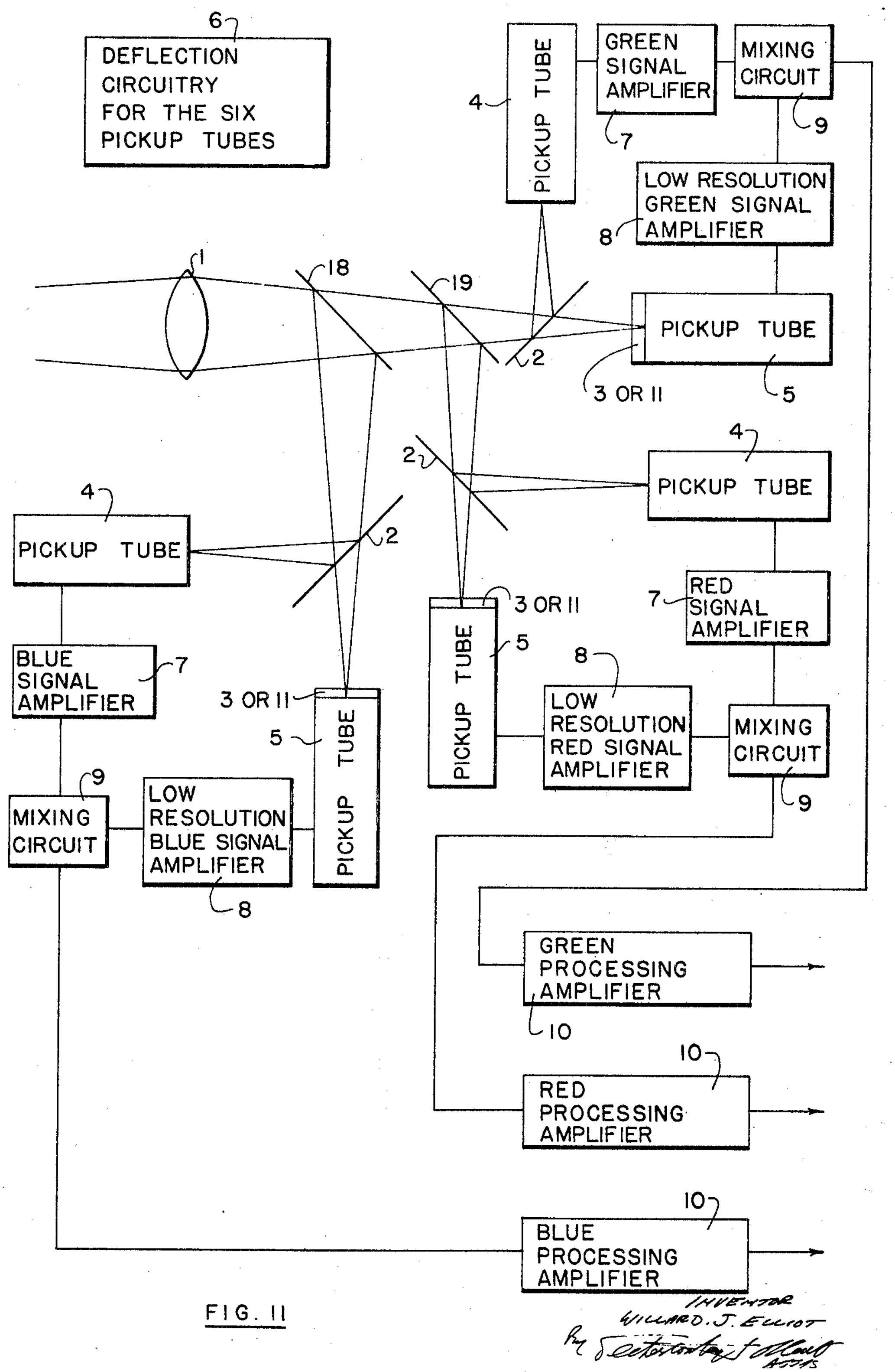
FIGURE 11 is a schematic block diagram showing an embodiment for a color camera using six pickup tubes.

FIGURE 6 is a group of waveforms and the object from which they are reproduced, illustrating the operation of the camera: 13 represents a sharply defined black area of the scene on a white background; 14 is a perfect theoretical waveform reproduction of the white black white of 13; 15 is the waveform reproduction of 13 that is produced by the Vidicon tube; 16 is the waveform reproduction of 13 that is produced by an image orthicon tube; 17 is the waveform reproduction of 13 that is produced by the amplifier associated with the pickup tube 5 when a piece of finely ground glass is used with the ground side placed against the face plate of the tube.

The mixing circuit can closely reproduce waveform 14 by substracting in proper proportion waveform 17 from waveform 15.

The mixing circuit can also closely reproduce waveform 16 by substracting in slightly different proportions waveform 17 from waveform 15. Thus this invention can either produce a perfect reproduction of the scene or it can reproduce an enhanced reproduction of the scene as obtained by the image orthicon tube.

FIGURES 7 to 11 inclusive show the invention specifically designed for use with colour cameras for colour transmission.

Currently colour cameras are made in several different types. One is the three tube camera which is essentially three black and white cameras operating from the same lens system but by using dichroic mirrors the light is divided into the three primary colours red, blue and green and each tube picks up one of these colours. The three primary colours are matrixed together in the proper proportions to form a black and white (luminance) signal. The three primary colours are matrixed to form signals which are the differences between the luminance and the colour signal. These difference signals modulate a colour subcarrier which is added to the luminance signal. At the receiver the colours are retrieved by demodulating the subcarrier and subtracting its various elements from the luminance signal.

A second type of colour camera utilizes four pickup tubes. The lens system utilizes a beam splitter and divides the light between a black and white camera tube and a group of three tubes which receive the primary colours by the use of dichroic mirrors. In this camera the black and white tube provides the luminance signal directly (thus avoiding registration problems) and the three primary colour pickup tubes are matrixed together to produce the difference signal which modulates the subcarrier which is added to the luminance signal.

A third type of colour camera utilizes two tubes. It is similar to the one just described in that one tube produces the luminance signal directly. The other tube has a special filter composed of a large number of strips of the three primary colours. By switching means the output of this tube is divided into three amplifiers each receiving a primary colour signal. These are matrixed together to form the difference signals that modulate the subcarrier that is added to the luminance signal.

When colour cameras are made using Vidicon or similar type pickup tubes they similarly do not have the crispness in the picture that they would have if they used image orthicon type pickup tubes.

Several embodiments of colour cameras are practical using the technique of this invention. The first type (FIG. 7) uses four pickup tubes. A beam splitter 2 divides the light between one low resolution luminance tube 5 and the three primary colour tubes 20, 21 and 22 which receive the proper primary colours by means of dichroic mirrors 18 and 19. The outputs of these three tubes amplified in 23, 24 and 25 are matrixed in 26 to produce a black and white (luminance) signal "Y" as well as the difference signals "I" and "Q" for the colour subcarrier which is added in 28 to the luminance signal.

The low resolution tube has a translucent element 3 or enlarged beam and translucent-transparent element 11, and its output amplified in 8 is mixed in 9 in the proper polarity and proportions to the luminance signal "Y" to produce the desired enhancement of the resulting colour picture.

A second type of colour camera (FIG. 8) utilizing the invention is a five pickup tube camera. It has suitable beam splitters 2 to divide the light from the lens three ways. One portion goes to a low resolution tube 5 which has a translucent element 3, or enlarged beam and translucent-transparent element 11. A second portion of the light goes to a standard black and white tube 4 which produces the luminance signal.

A third portion of the light is split into the three primary colours by dichroic mirrors 18 and 19 and thus the remaining three tubes 20, 21 and 22 produce the primary colour signals amplified in 23, 24 and 25 which are matrixed in 26 to form the difference signals "I" and "Q" that produce the colour subcarrier that is added in 28 to the luminance signal. The luminance signal is modified by mixing (reference character 9) with the low resolution signal in the proper proportions to produce the desired enhancement in the resultant colour picture.

A third type of colour camera (FIG. 9) utilizing this invention uses two pickup tubes 4 and 29. One tube 4 produces the luminance signal, the other tube 29 has the colour stripe filter 30 and produces the three primary colour signals by switching means 31 after amplification in 32.

In addition it has a translucent element 3 in the light path before the stripe filter 30. The matrixed output of the three primary colour signals 23, 24 and 25 of this tube produces a black and white signal "Y" of low resolution which is mixed in 9 in the proper proportion to the luminance signal to produce the desired enhancement in the resultant colour picture. The three primary colour signals also of course produce the difference signals "I" and "Q" which modulate in 27 the colour subcarrier which is added in 28 to the luminance signal. As the colour subcarrier signal is of low bandwidth its degradation by the addition of the translucent element is negligible.

A fourth type of colour camera (FIG. 10) utilizing this invention uses four pickup tubes. A beam splitter 2 divides the light between a black and white tube 4 and a group of three primary colour tubes 20, 21 and 22 each receiving the proper colour light by dichroic mirrors 18 and 19. Each of the three primary colour pickup tubes has a translucent element 3, or enlarged beam and translucent-transparent element 11.

The outputs amplified in 23, 24 and 25 of the three primary colour tubes are matrixed in 26 to form a black and white signal "Y" of low resolution which is mixed in 9 in the proper proportion with the signal from the black and white tube to produce the desired amount of enhancement in the resulting colour picture.

The three primary colours are matrixed in 26 to produce the difference signals "I" and "Q" which modulate in 27 the colour subcarrier which is added in 28 to the luminance (black and white) signal. Again as the colour subcarrier signal is of low bandwidth the degradation caused by the translucent element or enlarged beam and translucent-transparent element is negligible.

A fifth type of colour camera (FIG. 11) utilizing this invention uses six pickup tubes. It is composed of three pairs of tubes. Each pair producing one of the primary colours. Dichroic mirrors 18 and 19 divide the light from the lens into the three primary colours. Then the light of each primary colour is divided between its pair of pickup tubes by a beam splitter 2. One tube in each pair is the standard high resolution pickup tube 4, the other having a translucent element 3, or enlarged beam and translucent-transparent element 11 produces the low resolution signal which is mixed at 9 in the proper proportion with the high resolution signal to produce the desired enhancement in that colour output.

This camera is of greatest advantage where very high resolution is required in the resultant colour picture. The signal is transmitted by some other method than the standard colour subcarrier (such as separate channels for each colour) so that the advantage of the high resolution in each colour is maintained at the receive point.

These are five of the most practical embodiments of the invention in colour cameras. Non-linear amplifiers 12 may be utilized in any of the above embodiments. Other arrangements are, of course, possible.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a television camera assembly including a lens system for focusing image bearing light rays; in combination, a plurality of image pickup devices situated in angular relationship to one another, said pickup devices each including an image plate, beam splitting means in the path of said focused light rays to substantially divide said light rays between said image plates of said pickup devices, a translucent element adjacent the image plate of one or more of said pickup devices and in alignment with the portion of the light rays impinging on said plates, electronic amplifying means for each of said pickup devices, deflection circuitry for each of said pickup devices, and a mixing circuit connected to each of said amplifying means.

2. The device according to claim 1 which includes a non-linear amplifier in the amplifying means of said one or more of said pickup devices.

3. In a television camera assembly including a lens system for focusing image bearing light rays; in combination, a plurality of image pickup devices situated in angular relationship to one another, said pickup devices including an image plate, beam splitting means in the path of said focused light rays to substantially divide said light rays between said image plates of said pickup devices, a transparent-translucent element adjacent the image plates of one or more of said pickup devices and in alignment with the portion of the light rays impinging on said image plates, means to enlarge the electron beams in one or more of said pickup devices, electronic amplifying means for each of said pickup devices, a deflection circuit for said pickup devices, and a mixing circuit connected to each of said amplifying means.

4. The device according to claim 3 which includes a non-linear amplifier in the amplifying means of said one or more of said pickup devices.

References Cited

UNITED STATES PATENTS

| | | | |
|---|---|---|---|
| 2,972,012 | 2/1961 | Farber | 178—5.2 |
| 3,284,566 | 11/1966 | James et al. | 178—5.4 |

ROBERT L. GRIFFIN, Primary Examiner

ROBERT L. RICHARDSON, Assistant Examiner

U.S. Cl. X.R.

178—5.2, 7.85